A. L. PREIMESBERGER.
FRICTION CLUTCH PULLEY.
APPLICATION FILED JULY 31, 1920.

1,421,558.

Patented July 4, 1922.
2 SHEETS—SHEET 1.

A. L. Preimesberger
INVENTOR

BY Victor J. Evans
ATTORNEY

WITNESS:

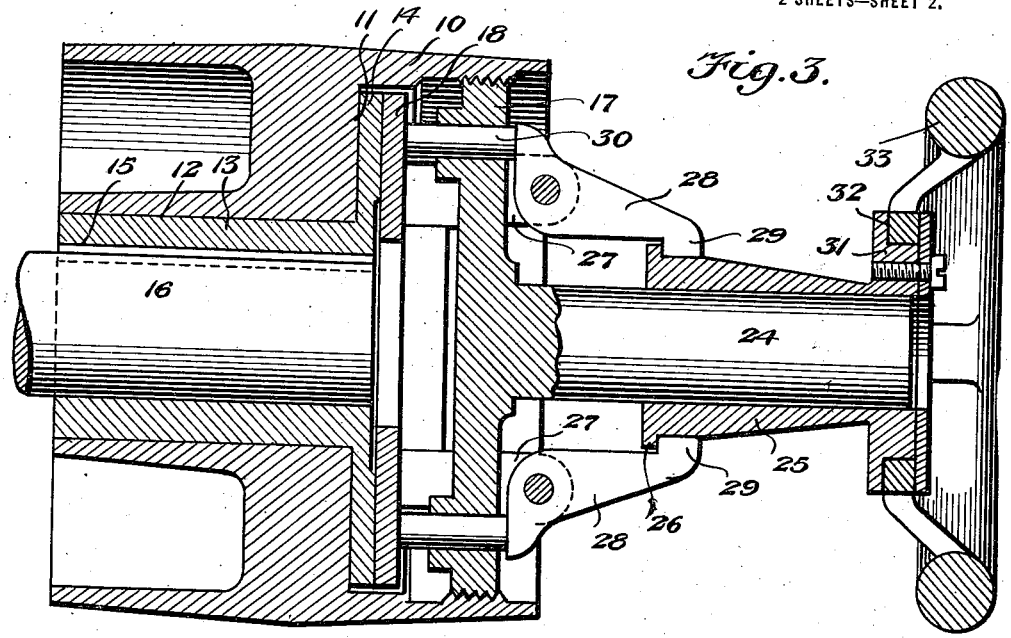
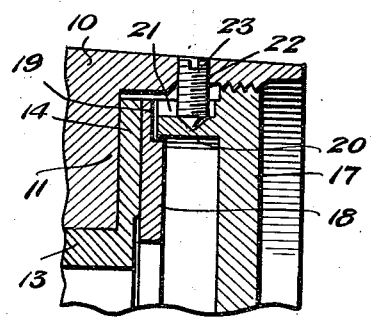
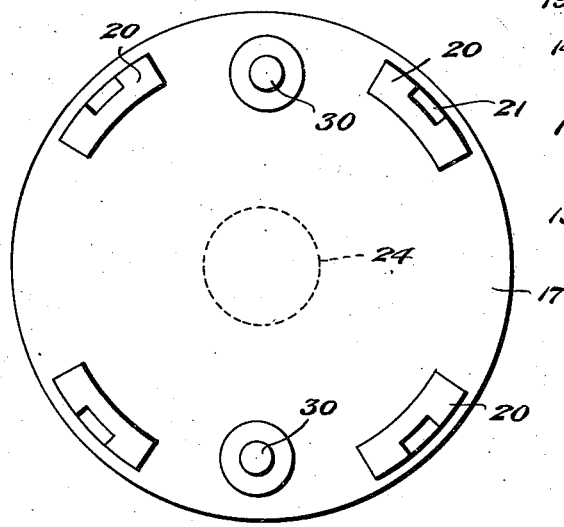

UNITED STATES PATENT OFFICE.

ALOIS L. PREIMESBERGER, OF MENASHA, WISCONSIN.

FRICTION-CLUTCH PULLEY.

1,421,558.	Specification of Letters Patent.	Patented July 4, 1922.

Application filed July 31, 1920. Serial No. 400,555.

*To all whom it may concern:*

Be it known that I, AMOS L. PREIMESBERGER, a citizen of the United States of America, residing at Menasha, in the county of Winnebago and State of Wisconsin, have invented new and useful Improvements in Friction-Clutch Pulleys, of which the following is a specification.

This invention relates to friction clutch pulleys, and comprehends a simple construction embodying means whereby the pulley can be easily connected to a continuously rotatable shaft when the use of the pulley is desired, or disengaged therefrom without necessitating the stopping of the shaft.

Another object of importance resides in the construction of means for engaging or disengaging the pulley from the shaft, this means providing for increased leverage so as to effectively move and hold the clutch elements in operative association.

The nature and advantages of the invention will be better understood when the following detailed description is read in connection with the accompanying drawing, the invention residing in the construction, combination and arrangement of parts as claimed.

In the drawings forming part of this application the like numerals of reference denote similar parts in the several views, and wherein:

Figure 3 is a longitudinal sectional view.

Figure 4 is an enlarged detail sectional view taken on line 4—4 of Figure 1.

Figure 5 is a face elevation of the end member of the clutch removed.

Figure 1:
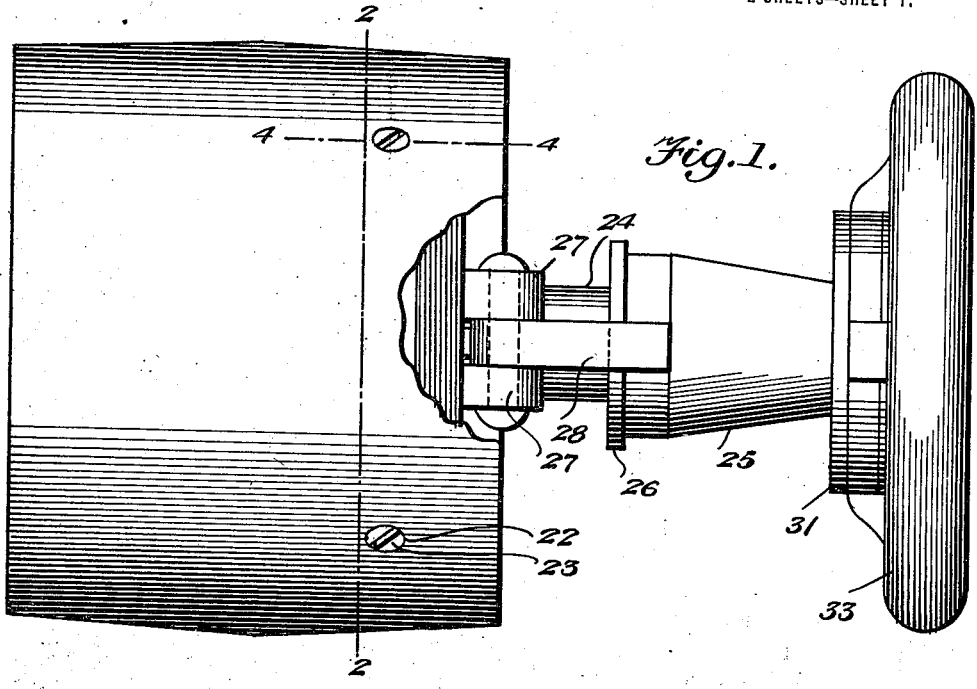
Figure 1 is a side elevation of a pulley partly in section constructed in accordance with my invention.
Figure 2:
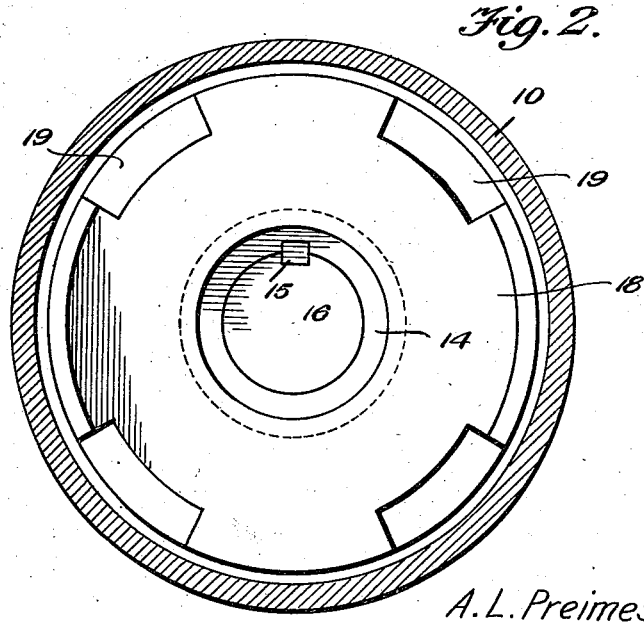
Figure 2 is a transverse sectional view on line 2—2 of Figure 1.

Referring to the drawings in detail, 10 indicates the pulley in which is arranged one of a number of clutch disks indicated at 11, and which disk is carried by the pulley for rotation therewith. The disk is provided with an enlarged central opening 12 to receive the hollow tubular extension 13 projecting from one side of what I term a floating clutch disk 14, the tubular member being provided with longitudinal grooves 15 to accommodate a key utilized for holding this member together with the clutch disk 14 fixed to the continuously rotatable shaft 16. Interposed between the end wall of the pulley and the floating clutch disk 14 is an additional clutch disk 18 secured to the pulley for rotation therewith in the manner to be presently described. One side of the disk 18 is provided with a plurality of diametrically opposed depressions 19 which receive the lugs 20 projecting from the adjacent side of the end wall 17 of the pulley. These lugs are provided with grooves 21 which coincide with the openings 22 in the pulley 10 to receive the locking elements or bolts 23 as shown. The end wall 17 is removably associated with the pulley 10 and is preferably threaded into the latter. The pulley is normally loose upon the shaft 16 and can be engaged therewith in a quick and easy manner by operatively associating the floating clutch disk 14 with the other disk 18 of the clutch mechanism. This is accomplished in a manner to be presently described.

Projecting from the end wall 17 of the pulley is a stub shaft 24 upon which is slidably fitted a tapered collar 25 which is preferably provided with an annular flange 26 at the large end thereof. Projecting from the end wall 17 at diametrically opposite points, are spaced pairs of apertured lugs 27 between each pair of which is pivoted their lever 28. These levers are pivoted at points between their ends, and the corresponding extremities of these levers are offset as at 29 to cooperate with the tapered collar when the latter is utilized to spread the levers apart. The opposite corresponding ends of these levers contact with sliding plungers 30 operating in bores provided in the end wall 17 of the pulley, and which plungers when moved inwardly against the disk 18, cause frictional engagement between all of the disks of the clutch whereby the latter is rendered operative to hold the pulley fixed with relation to the shaft 16. Carried by the outer end of the tapered collar 25 is an annular member 31 which is grooved as at 32, and upon which the hand wheel 33 is swiveled. This construction permits of the hand wheel being engaged to adjust the tapered collar 25 upon the stub shaft 24 when the occasion requires, and while the shaft 16 is rotating.

In practice, the pulley 10 is normally loose upon the shaft 16, and the disks 11 and 18 of the clutch mechanism associated therewith rotate with the pulley. The floating disk 14 together with the tubular extension 13 is keyed upon the shaft 16 for rotation therewith. When it is desired to lock the pulley upon the shaft 16, the hand wheel 33 is grasped by the operator and moved outwardly to slide the collar 25 upon the stub shaft 24. The collar is tapered, and consequently cooperates with the corresponding extremities of the lever 28 to spread the latter, thereby causing these levers to push the plungers 30 inwardly into effective engagement with the adjacent disk 18. The construction is such that maximum leverage is provided for, so that the sliding plungers are forcibly moved into engagement with the adjacent disk 18, thereby clamping the floating disk 14 between the remaining disks of the clutch and holding the pulley in its entirety in fixed relation to the shaft 16. In order to separate or disengage the pulley from the shaft, it is only necessary to move the collar 25 upon the stub shaft 24 in a direction toward the pulley.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim is:

In a friction clutch, a pulley, a plurality of clutch disks associated with the pulley for rotation therewith, a shaft, an additional clutch disk fixed upon said shaft and interposed between the aforementioned disks upon which said pulley is loosely mounted, said pulley including an end wall, a shaft projecting from said end wall, a tapered collar slidable on said second mentioned shaft, means for adjusting said collar, plungers movable in bores provided in said end wall, and levers pivoted upon the end wall and actuated by said collar to move the plungers into engagement with the adjacent disk, whereby all of said disks are operatively associated to fix said pulley to the shaft.

In testimony whereof I affix my signature.

ALOIS L. PREIMESBERGER.